Jan. 17, 1961
S. N. SAIIA
2,968,219
MOTION PICTURE PROJECTION SCREEN OF
THE FRONT PROJECTION TYPE
Filed Oct. 14, 1957
Fig.1.
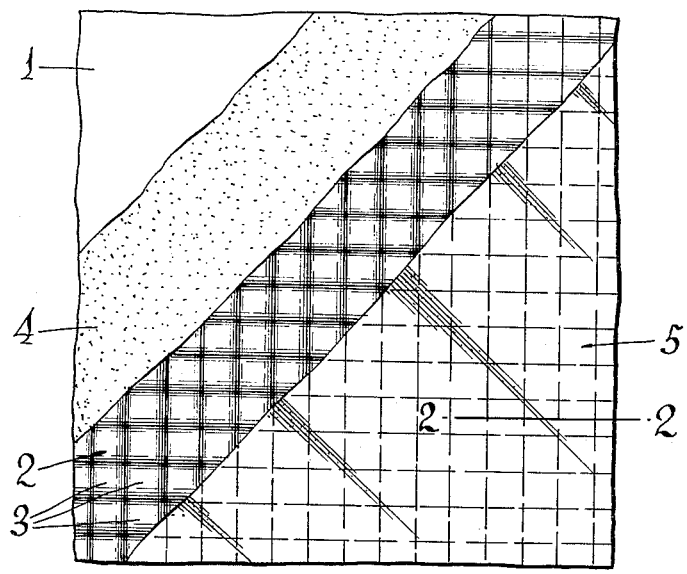
Fig.2.
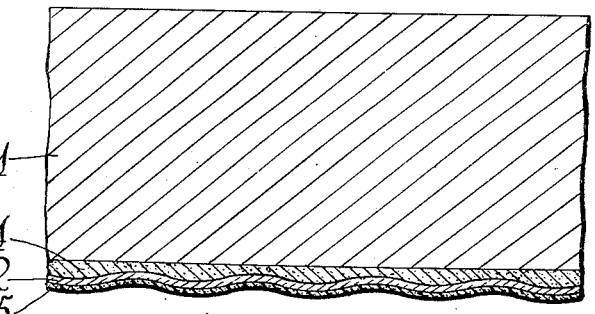
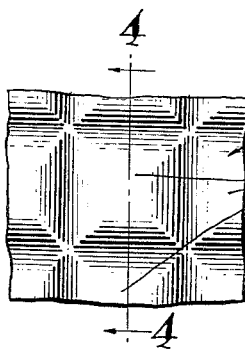
Fig.4.
Fig.3.
INVENTOR.
Samuel N. Saiia,
BY
Johns Powers
ATTORNEY.

U nited States Patent Office 2,968,219
Patented Jan. 17, 1961

2,968,219

MOTION PICTURE PROJECTION SCREEN OF THE FRONT PROJECTION TYPE

Samuel N. Saiia, 447 Richmond Ave., Buffalo 22, N.Y.

Filed Oct. 14, 1957, Ser. No. 690,084

3 Claims. (Cl. 88—28.9)

This invention relates to improvements in motion picture projection screens of the front projection type and proposes a screen which is of particular value and advantage for use in outdoor motion picture theaters, commonly known as "drive-in" theaters wherein the viewers observe the picture while seated in their cars. The features of the invention which make the improved screen of particular value for such use do not inhibit its use in those indoor theaters wherein advanced methods of projection may necessitate front projection screens of greatly increased width and depth as compared with the screens used in the smaller houses in which the front projection system is of the usual character.

In order that drive-in theaters may be profitably operated it is necessary that they have a viewing space which will accommodate a large number of standard passenger cars, a large percentage of such theaters having accommodations for as many as four hundred cars. Owing to the depth limitation of the viewing area and the necessity for transverse aisles to insure the mobility of the cars on arrival and departure the viewing space necessarily has a width much greater than the width of the auditorium of the larger indoor theaters. Considering the number of cars to be accommodated, the space occupied by each, the limitations on the number of transverse rows of cars and the floor grades for the several rows of cars screens of greatly increased width and depth (as compared with indoor theater screens) are required, the dimensions of these larger screens ranging from 70 feet in width and 40 feet in depth to 110 feet in width and 60 feet in depth, and being selected in accordance with the dimensions and floor grades of the viewing space. Notwithstanding the increased dimensions of the larger screens and the resultant increase in the width of the viewing space, there are viewers who occupy positions laterally beyond the ends of the screens and whose vision of the picture is distorted.

As to structural character the screens of drive-in theaters have heretofore consisted of a rigid base to which, on the projection side, a coating of white paint is applied, the requirement being for a paint to which a suitable percentage of titanium or aluminum is added and which gives a flat finish. The rigid base is usually composed of sections of plywood attached to a metal or wooden supporting frame. In some instances the rigid base has been composed of a sheet of galvanized steel attached to a metal supporting frame.

The structural characteristics of the prior screens of drive-in theaters are such that the screens have many and marked inherent disadvantages which present serious problems of maintenance and reflecting quality.

The plywood base is sensitive to weather conditions and is adversely affected by rain or conditions of humidity or prolonged extreme dryness, in either case being rapidly subject to such warping as produces a marked distortion of the picture and causes flaking and chipping of the paint. Independently of the warping of the plywood the paint is also adversely affected by the conditions and over a period of time is subject both to flaking and chipping and also to impairment of its initial reflecting quality, the surface becoming increasingly flat to a degree such that the reflection is quite poor. The results of the warping of the plywood and the impairment of the paint are a short life of the screen and the necessity for frequent repainting. When a section of the plywood becomes warped it is necessary to replace it with a new section and in many cases, due to warping, it is necessary to provide a new base. Such replacement, either of one or more of the plywood sections or of the entire base may be required two or three times a year and in any case necessitates a new application of the paint. The replacement of the plywood is quite expensive, the cost over a period of a year being several hundred dollars; and the repainting job, depending of course on the size of the screen, usually has a cost in a range between four hundred dollars and one thousand dollars. Even though the base should remain in useable condition it is frequently necessary, that is to say two or three times a year, to repaint the reflecting surface.

The galvanized steel base has the objection of rapid rusting which adversely affects the painted reflecting surface and necessitates even more frequent repaintings than are required with the plywood base.

The reflective quality of the painted surface is substantially impaired by the incidence of ambient light. For this reason a limitation is imposed on the hour at which the film is displayed, the darkness of night being required. The reflecting surface also lacks the quality of diffusion and does not provide for any increase of the angle of reflection beyond the sides of the screen. It follows that the view of the picture to those who are seated beyond the sides of the screen will be subject to distortion.

In the screens of indoor theaters the qualities of diffusion, absorption of ambient light, and increase of the viewing angle beyond the sides of the screen have been attained in adequate degree by making the reflecting surface of lenticular form, the relatively minute lenticles (having a diameter of the order of one hundredth of an inch) of course extending uniformly over the entire reflective surface. Various forms of lenticular embossment applicable to front projection screens are disclosed in a number of U.S. patents, suitable examples being shown in the patents to Raven No. 1,985,460 of December 25, 1934, and Huber No. 2,627,200 of February 5, 1953. The lenticular embossment of the screens of indoor theaters is possible because of the physical (structural) characteristics of such screens. However in the case of outdoor theaters which require rigid and heavy wind resisting bases to one face of which the reflective coating of paint is applied, the physical or constructional characteristics have been such that lenticular embossment of the reflecting surface is not possible.

The object of the invention is to provide a screen of the front projection type for outdoor motion picture theaters which will have a wind resisting base warp-proof, rust-proof in any climate and an applied climate-proof lenticular reflecting face of permanent character in other words to provide a screen which without maintenance cost will be permanently operative at optimum efficiency, including an optimum angle of lateral vision (i.e. vision from beyond the ends of the screen) without distortion of the picture.

For the attainment of the above object the invention consists of a novel combination of elements, viz. a base of grainless manufactured board made entirely from wood fibers, a sheet of stainless steel foil rolled to a thickness within a range of the order of .002 to .004 inch and embossed with a lenticular or semi-lenticular pattern, a suitable cement applied coextensively to the base and the sheet of foil and uniting them in laminated fashion and an acrylic resin in which particles of a finely powdered inert white pigment are suspended and which is applied to the exposed surface of the foil either by a spraying operation or by a coating roller, the acrylic resin of course being of liquid form upon its application and as an extremely thin film drying and hardening after a few minutes of exposure to air at room temperature. The manufactured board which provides the base is of the kind which is sold under the name of "Presdwood" and is ideally of the kind which is sold under the name of "Tempered Presdwood." Such board is grainless and composed of clean yellow pine wood chips exploded under high steam pressure with the resulting fibers thoroughly felted and compactly compressed into board form in steam heated, flat-bed, hydraulic presses. The ideal board is thereafter subjected to a special tempering process which consists of impregnation with a liquid which is then polymerized by baking. The board base has a thickness within a range of from one-eighth to one-quarter inch and resists warping under any climatic conditions, the "Tempered Presdwood" being preferred because it is wholly warp-proof. Various cements are on the market which are suitable for rigidly bonding the sheet of stainless steel foil to the base and thereby providing a laminated structure. The most effective bond is a rubber based cement, the thickness of the bonding layer being of the order of one thirty-second of an inch. The stainless steel foil as it comes from the rollers has a specular face with a brilliance count as measured on a reflectometer of the order of 4.50, taking the brilliance count of white magnesium paint as unity. The brilliance count of the stainless steel foil is too great for the eyes to bear. Since the acrylic resin is colorless and virtually wholly transparent one function of the white pigment is to utilize the reflecting capacity of the specular face of the stainless steel foil while reducing its brilliance to a count of the order of 2.50 which is suitably below the count that causes eye strain. The layer of acrylic resin as applied to the lenticular face of the stainless steel foil is film-like, that is to say of the order of .001 inch in thickness and of course conforms to the embossment of the stainless steel foil and is similarly lenticular. Since the minute opaque particles of white pigment are in suspension throughout the layer of acrylic resin they have the added function of reflecting prisms, that is to say they will reflect the light from the source from one to another and thus through various paths to the specular face of the steel foil and will similarly direct the light reflected from the face of the steel foil into the viewing area. The lenticular pattern of the reflective surface of the screen has the usual advantageous diffusive quality and the usual advantage of extending the viewing angle beyond the sides of the screen. The lenticular pattern, because it substantially avoids the impairment of the reflection by the incidence of ambient light, enables the picture to be displayed during the twilight period, thereby eliminating the necessity of dependence on the darkness of night and enabling a substantially longer audience period.

As of foil thickness of the order of .002 to .004 inch the stainless steel is readily embossed with the lenticular pattern by passing it between patterned rollers which, because of the foil thickness of the steel, are operative without any requirement for extreme pressure and which, as to the pattern and because of the foil thickness of the steel and the relatively light pressure required for the embossing operation, retain their pattern without impairment, that is to say without undue wear by the steel, through an indefinitely long useful life.

In the drawing:

Figure 1 is an elevation of the screen looking at its front or reflecting face and partially broken away to show the different layers of which the screen is composed.

Figure 2 is a horizontal section on the line 2—2 of Figure 1.

Figure 3 is an enlarged fragmentary elevation showing schematically the lenticulated specular face of the layer of stainless steel foil.

Figure 4 is a detail sectional view on the line 4—4 of Figure 3.

The structural components of the screen are the base 1 of manufactured wood as above described, and which has a thickness of from one-eighth to one-quarter inch, a thickness of one-quarter inch being preferred, the stainless steel foil 2 having a thickness of the order of .002 to .004 inch and embossed with the minute lenticles 3, the layer of cement 4 between the foil 2 and the base 1 and which bonds the foil to the base, producing a laminated structure, and the coating of acrylic resin 5 which is applied to the exposed face of the foil 2 and carries in suspension minute opaque particles of white pigment operative as above described. The manufactured wood of which the base 1 is composed is highly warp resisting under any climatic conditions. If the manufactured wood be untempered its useful life will be many times in excess of the useful life of plywood ordinarily used although under certain climatic conditions it may be subject to slow warping over a period of two or three years. Hence the preference is for the tempered manufactured wood as above described and which is wholly warp-proof under any climatic conditions and therefore will have a useful life of indefinite duration. The base 1 is attached to a suitable supporting frame (not shown) as known to the art and which is preferably composed of metal bars, the metal frame commonly being referred to as a "tower." The showing of the lenticles 3 is schematic, it being understood that these may be of any form and dimensions known to the prior art as satisfactory for the purposes in view.

In respect to manufacture: The manufactured wooden base 1 is made in sections, the standard size of each section being twelve feet (horizontal width) by sixteen feet (vertical depth or length). The stainless steel foil is rolled to a maximum width of thirty-six inches and there is no limitation upon its lineal extent. Hence a section of the wooden base will carry four lineally coextensive sections of the stainless steel foil, these being arranged with their adjacent edges in abutting relation. The cement 4 is applied to a face of a section of the wooden base by a standard roller operation and the sections of steel foil initially placed in proper position upon a section of the wooden base to which the cement has been applied, are pressed upon cement by a standard roller operation, the cement having uniform contact with adjacent faces of the base 1 and the steel foil 3 and, upon setting, rigidly bonding the foil to the base in a laminated structure. If the acrylic resin is to be applied by a spraying operation, the foil is first applied to the base and the acrylic resin is thereupon sprayed upon the foil to an extent such that it entirely covers the foil and, as its sets, conforms to the lenticular pattern of the foil. Alternatively if it be desired that the acrylic resin be applied to the foil by a roller operation the application of acrylic resin to the lenticulate foil is made before the foil is applied to the base, this latter step being performed after the acrylic resin has set.

The sections of the manufactured wooden base can of course be reduced in dimensions by a sawing operation as necessity may require. The manufacturer of the screen, upon being advised of its dimensions, prepares the screen sections in the manner above described, utilizing the standard sizes of the manufactured wooden sections to the extent permissible and providing such reduced sizes as may be necessary for the completion of the screen of the specified dimensions. The screen sections with the foil, bearing the coating of acrylic resin and bonded by the cement to the sections of manufactured wood, are thereupon shipped and the screen sections are assembled at the destination to form the complete screen which, as above described, is attached to the supporting frame and is thereupon ready for use. Since the material of the base 1 is warp-proof and rust-proof and the metal foil 3 is not subject to tarnish, the screen has an indefinite period of useful life without maintenance expense, its first cost (purchase price) being its only cost.

The particular materials specified in the foregoing description, namely "Presdwood" or "Tempered Presdwood" and stainless steel foil are the best materials now known to me for the accomplishment of the purposes of the invention. What is important is the particular qualities of the materials. Since in the future other materials may be invented or evolved which will be economically practical and will have in sufficient degree the essential qualities which the invention demands certain of the following claims describe the materials in terms of their form and essential qualities and therefore are without limitation to materials of any particular physical or chemical composition.

I claim:

1. A motion picture projection screen of the front projection type, comprising in combination: a base of grainless wood board composed entirely of wood fibers thoroughly felted and compactly compressed into board form, the base being rust-proof and warp resistant, an element composed of stainless steel foil having a thickness of the order of .002 to .004 inch, coextensive in area with the base, having a specular exposed face and embossed throughout its area with a pattern of relatively minute lenticles, a layer of cement between and in contact with the base and the metal foil and which rigidly bonds the metal foil to the base in a laminated structure, and a thin film-like coating of an acrylic resin applied to the specular face of the stainless steel foil, the acrylic resin throughout its extent carrying in suspension minute inert particles of white opaque pigment which act upon the direct and reflected rays of light in the substantial manner of reflecting prisms, thereby to cause the light rays from the source to travel through various paths to the specular face of the stainless steel foil and to direct the rays reflected by such specular face through like paths into the viewing area.

2. A motion picture projection screen as set forth in claim 1 wherein the base of grainless wood board is tempered by impregnation with a liquid which is polymerized by baking.

3. A motion picture projection screen of the front projection type which comprises, in combination: a wind resisting base of board-like form and composed of rust-proof and warp-proof material, an element composed of stainless steel foil having a thickness of the order of .002 to .004 inch, coextensive in area with the base, having a specular exposed face and embossed throughout its area with a pattern of relatively minute lenticles, a layer of cement between and in contact with the base and the metal foil and which rigidly bonds the metal foil to the base in a laminated structure, and a thin film-like coating of an acrylic resin applied to the specular face of the stainless steel foil, the acrylic resin throughout its extent carrying in suspension minute inert particles of white opaque pigment which act upon the direct and reflected rays of light in the substantial manner of reflecting prisms, thereby to cause the light rays from the source to travel through various paths to the specular face of the stainless steel foil and to direct the rays reflected by such specular face through like paths into the viewing area.

References Cited in the file of this patent

UNITED STATES PATENTS

| | | |
|---|---|---|
| 410,598 | Koyl | Sept. 10, 1889 |
| 1,528,533 | Davis | Mar. 3, 1925 |
| 1,854,864 | Semenitz | Apr. 19, 1932 |
| 2,271,614 | Baselt | Feb. 3, 1942 |
| 2,374,566 | Tanaka | Apr. 24, 1945 |
| 2,579,892 | Wright | Dec. 25, 1951 |
| 2,804,801 | Mihalakis | Sept. 3, 1957 |